(12) United States Patent
Hawthorne et al.

(10) Patent No.: US 10,567,630 B2
(45) Date of Patent: Feb. 18, 2020

(54) IMAGE CAPTURE USING A HINGED DEVICE WITH MULTIPLE CAMERAS

(71) Applicant: Microsoft Technology Licensing, LLC, Redmond, WA (US)

(72) Inventors: Bryant Daniel Hawthorne, Duvall, WA (US); Mario Emmanuel Maltezos, Redmond, WA (US); Christian Michael Sadak, Seattle, WA (US); John Benjamin Hesketh, Kirkland, WA (US); Andrew Austin Jackson, Bellevue, WA (US); Adolfo Hernandez Santisteban, Bothell, WA (US); Kenneth Liam Kiemele, Redmond, WA (US); Charlene Jeune, Redmond, WA (US); Jeffrey R. Sipko, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 58 days.

(21) Appl. No.: 15/632,201

(22) Filed: Jun. 23, 2017

(65) Prior Publication Data

US 2018/0332205 A1    Nov. 15, 2018

Related U.S. Application Data

(60) Provisional application No. 62/505,653, filed on May 12, 2017.

(51) Int. Cl.
*H04N 5/232* (2006.01)
*H04N 5/247* (2006.01)
(Continued)

(52) U.S. Cl.
CPC ........... *H04N 5/232* (2013.01); *G06F 1/1605* (2013.01); *G06F 1/1618* (2013.01);
(Continued)

(58) Field of Classification Search
CPC ...................................................... H04N 5/232
See application file for complete search history.

(56) References Cited

U.S. PATENT DOCUMENTS 3,159,087 A    12/1964  Wanner
8,004,558 B2   8/2011   Prechtl et al.
(Continued)

FOREIGN PATENT DOCUMENTS

CN    203133468 U    8/2013
CN    103533266 A    1/2014
(Continued)

OTHER PUBLICATIONS

Dansereau, et al., "A Wide-Field-of-View Monocentric Light Field Camera", In Journal of Computer Vision and Pattern Recognition, Retrieved on: May 11, 2017, 10 pages.
(Continued)

*Primary Examiner* — Jefferey F Harold
*Assistant Examiner* — Justin B Sanders
(74) *Attorney, Agent, or Firm* — Alleman Hall Creasman & Tuttle LLP

(57) ABSTRACT

To address issues of capturing and processing images, a mobile computing device is provided. The mobile computing device may include a two-part housing coupled by a hinge, with first and second parts that include first and second displays, respectively. The hinge may permit the displays to rotate throughout a plurality of angular orientations. The mobile computing device may include one or more sensor devices, processor, first camera, and second camera mounted in the housing. The one or more sensor
(Continued)

devices may be configured to measure the relative angular displacement of the housing, and the processor may be configured to process images captured by the first and second cameras according to a selected function based upon the relative angular displacement measured by the one or more sensor devices.

20 Claims, 12 Drawing Sheets

(51) Int. Cl.
| | |
|---|---|
| G06F 1/16 | (2006.01) |
| G06F 3/01 | (2006.01) |
| H04N 5/225 | (2006.01) |
| H04N 13/243 | (2018.01) |
| H04N 13/257 | (2018.01) |
| H04N 13/296 | (2018.01) |

(52) U.S. Cl.
CPC ............ *G06F 1/1694* (2013.01); *G06F 3/017* (2013.01); *H04N 5/2253* (2013.01); *H04N 5/23238* (2013.01); *H04N 5/23293* (2013.01); *H04N 5/247* (2013.01); *H04N 13/243* (2018.05); *H04N 13/257* (2018.05); *H04N 13/296* (2018.05); *H04N 2213/001* (2013.01)

(56) References Cited

U.S. PATENT DOCUMENTS

| | | | |
|---|---|---|---|
| 8,203,833 | B2 | 6/2012 | Huang et al. |
| 8,988,398 | B2 | 3/2015 | Cao et al. |
| 9,185,391 | B1 | 11/2015 | Prechtl |
| 2003/0071914 | A1 | 4/2003 | Wei et al. |
| 2010/0182265 | A1 | 7/2010 | Kim et al. |
| 2014/0293024 | A1 | 10/2014 | Choi et al. |
| 2014/0378183 | A1 | 12/2014 | Xiong et al. |
| 2015/0116364 | A1* | 4/2015 | Aurongzeb ........... G06F 3/0487 345/659 |
| 2015/0130725 | A1* | 5/2015 | Knepper ............... G06F 1/1643 345/173 |
| 2015/0324002 | A1* | 11/2015 | Quiet ................. H04N 5/23238 463/31 |

FOREIGN PATENT DOCUMENTS

| | | |
|---|---|---|
| CN | 106331480 A | 1/2017 |
| WO | 2005048586 A1 | 5/2005 |

OTHER PUBLICATIONS

Liu, et al., "A Master-Slave Surveillance System to Acquire Panoramic and Multiscale Videos", In Scientific World Journal, Mar. 3, 2014, pp. 1-11.

"International Search Report and Written Opinion Issued in PCT Application No. PCT/US2018/028739", dated Jul. 6, 2018, 15 Pages.

* cited by examiner

IMAGE CAPTURE USING A HINGED DEVICE WITH MULTIPLE CAMERAS

CROSS REFERENCE TO RELATED APPLICATIONS

This application claims priority to U.S. Provisional Patent Application No. 62/505,653, filed on May 12, 2017, the entirety of which is hereby incorporated herein by reference.

BACKGROUND

Mobile computing devices allow users to conveniently view and share images, application programs, and digital content, as well as capture images and video content. Conventional mobile computing devices typically offer one or two cameras, and sensors with limited features. While such devices are sufficient for capturing simple images and video, a user may find it challenging or impossible to capture images or video that require unconventional orientations of the mobile computing device and/or advanced sensor data. Many camera operations may be hindered by complicated procedures and/or the requirement of additional software or equipment. Additionally, the captured images are limited in how they may be processed to achieve a desired output effect.

SUMMARY

To address the above issues, a mobile computing device is provided. The mobile computing device may include a housing having a first part and a second part coupled by a hinge. The first part may include a first display and the second part may include a second display, and the hinge may be configured to permit the first and second displays to rotate between angular orientations from a face-to-face angular orientation to a back-to-back angular orientation. The mobile computing device may further comprise one or more sensor devices mounted in the housing, a first camera mounted in the first part of the housing, a second camera mounted in the second part of the housing, and a processor mounted in the housing. The one or more sensor devices may be configured to measure the relative angular displacement between the first and second parts of the housing, and the processor may be configured to process images captured by the first and second cameras according to a selected function based upon the relative angular displacement measured by the one or more sensor devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors of the subject application have discovered that capturing images on a mobile computing device is constrained by the user's ability to manipulate the device into a desired position, as well as by the capacity of the device to perform image capture functions and process the captured images. Conventional mobile computing devices are sufficient for capturing simple images and video, but a user may desire to capture images or video content that require unconventional orientations of the mobile computing device and/or advanced sensor data. Manipulating a mobile computing device to capture an image with a desired perspective or effect may be cumbersome or even impossible for the user. Advanced image capturing and processing functions often require additional software and equipment, which may present a financial burden to the user. Additionally, installing, setting up, and using the software and equipment can involve complicated and time-consuming instructions that may cause a user to feel frustrated and discouraged.

Figure 1:
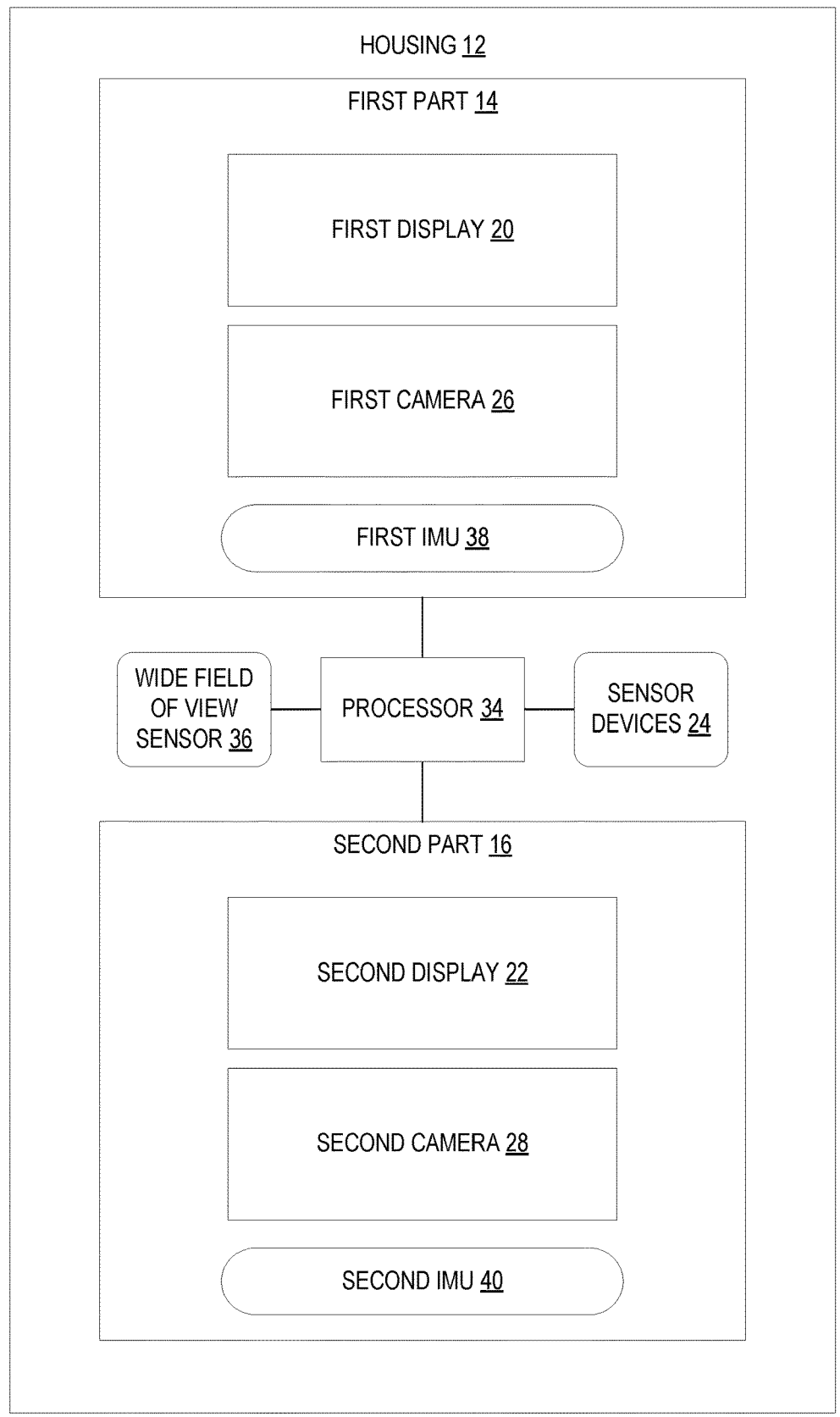
FIG. 1 shows a schematic of an example mobile computing device of the present description.

As schematically illustrated in FIG. 1, to address the above identified issues a mobile computing device 10 is provided. The mobile computing device 10 may, for example, take the form of a smart phone device. In another example, the mobile computing device 10 may take other suitable forms, such as a tablet computing device, a wrist mounted computing device, etc. The mobile computing device 10 may include a housing 12, which, for example, may take the form of a casing surrounding internal electronics and providing structure for displays, sensors, speakers, buttons, etc. The housing 12 may have a first part 14 and a second part 16 coupled by a hinge 18. The first part 14 may include a first display 20, and the second part 16 may include a second display 22. The hinge 18 may be configured to permit the first and second displays 20, 22 to rotate between angular orientations from a face-to-face angular orientation to a back-to-back angular orientation.

The mobile computing device 10 may further include one or more sensor devices 24 and a processor 34 mounted in the housing 12, a first camera 26 mounted in the first part 14 of the housing 12, and a second camera 28 mounted in the second part 16 of the housing 12. The one or more sensor devices 24 may be configured to measure the relative angular displacement between the first and second parts 14, 16 of the housing 12, and the processor 34 may be configured to process images captured by the first and second cameras 26, 28 according to a selected function based upon the relative angular displacement measured by the one or more sensor devices 24. In the example implementation of the present application, the one or more sensor devices 24 configured to measure the relative angular displacement between the first and second parts 14, 16 of the housing 12 may be in the form of an angle sensor 24A arranged in the housing 12 of the mobile computing device 10. However, it will be appreciated that another type of sensor, such as one or more inertial measurement units as discussed below, may be configured to measure the relative angular displacement between the first and second parts 14, 16 of the housing 12.

Figure 2A:
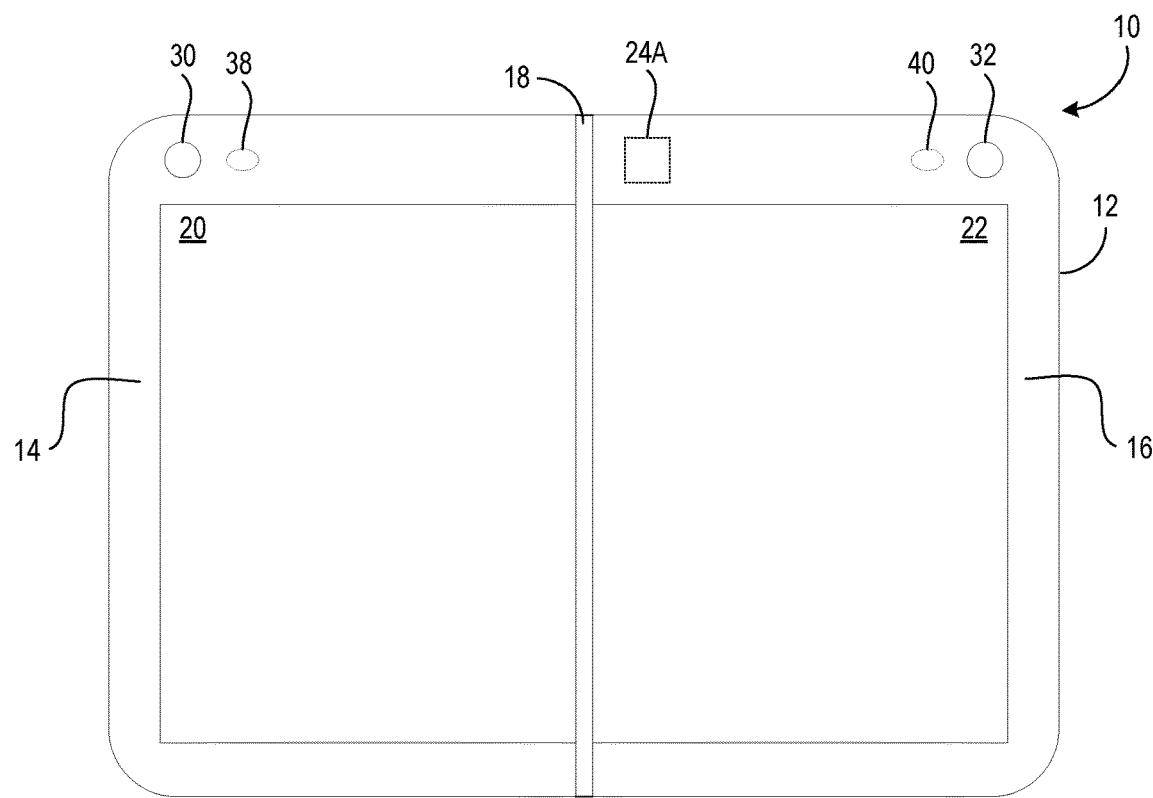
FIGS. 2A and 2B show front and back views, respectively, of the mobile computing device of FIG. 1 with the first and second displays 20, 22 arranged in an open, side-by-side orientation.
Figure 2B:
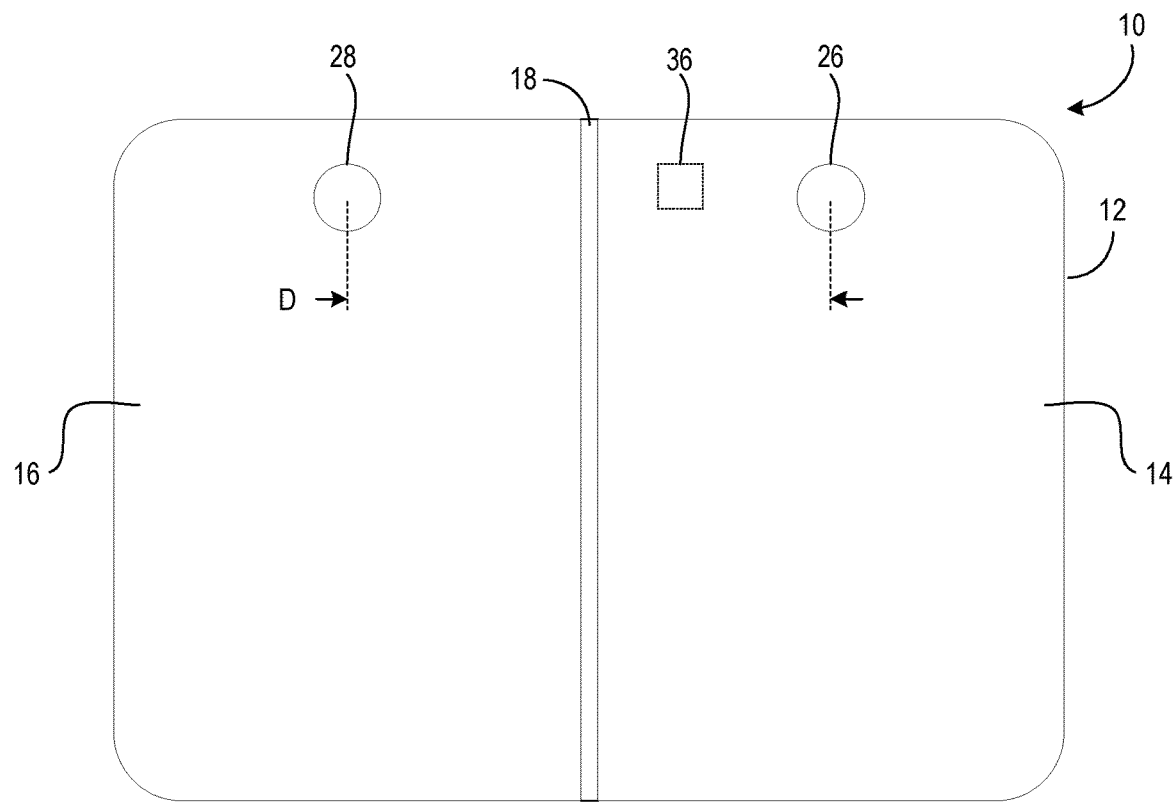

As further illustrated in FIG. 1, a wide field of view sensor 36 may be mounted in the housing 12 of the mobile computing device 10. The wide field of view sensor 36 may be configured to define a plurality of tracking points that determine a spatial orientation of the device 10. In some implementations, such as capturing a panoramic image, a user may scan the environment with the mobile computing device 10 while the cameras 26, 28 capture a plurality of images. In these cases, the tracking points provide data to stabilize the images and assist in the post processing stitching of the images to recreate the environment. As shown in FIGS. 2A and 2B, a distance (D) between the centers of the first and second cameras 26, 28 can be used in conjunction with data from the angle sensor 24A and the wide field of view sensor 36 to further process and stitch together captured images. While the example implementation includes a wide field of view sensor 36, it will be understood that another type of sensor, such as a time-of-flight sensor or a sonar based depth sensor may be used in addition or alternatively to the wide field of view sensor to determine the spatial orientation of the device 10.

Returning to FIG. 1, to provide additional stability and information regarding the orientation of the mobile computing device 10, a first inertial measurement unit 38 may be included in the first part 14 of the housing 12, and a second inertial measurement unit 40 may be included in the second part 16 of the housing 12. When included, the first and second inertial measurement units 38, 40 may each be configured to measure a magnitude and a direction of acceleration in relation to standard gravity to sense an orientation of the respective parts of the housing 12. Accordingly, the inertial measurement units 38, 40 may include accelerometers, gyroscopes, and possibly magnometers configured to measure the position of the mobile computing device 12 in six degrees of freedom, namely x, y, z, pitch, roll and yaw, as well as accelerations and rotational velocities, so as to track the rotational and translational motion of the mobile computing device 10. Additionally or alternatively, the first and second inertial measurement units 38, 40 may be configured to measure the relative angular displacement between the first and second parts 14, 16 of the housing 12. The processor 34 may be further configured to process input from the one or more sensor devices and the first and second inertial measurement units 38, 40 to define a hinge gesture. As discussed in detail below, the hinge gesture may determine a camera function.

FIGS. 2A and 2B illustrate front and back views, respectively, of an example mobile computing device 10 with the first and second parts 14, 16 arranged in a flat orientation. As shown, the example mobile computing device 10 includes a housing 12. As discussed above, the housing 12 may be configured to internally house various electronic components of the example mobile computing device 10, including the processor 34 and various sensor devices. Additionally, the housing 12 may provide structural support for the first and second displays 20, 22 and the sensor devices 24, the wide field of view sensor 36, and the first and second inertial measurement units 38, 40. It will be appreciated that the listed sensor devices are exemplary, and that other types of sensors not specifically mentioned above, such as capacitive touch, ambient light, time-of-flight, and/or sonar based depth sensors, may also be included in the mobile computing device 10.

In some implementations, the mobile computing device 10 may further include a third camera 30 and a fourth camera 32. In such implementations, the processor may be further configured to process images captured by the third and fourth cameras 30, 32. As illustrated in FIG. 2A, the third camera 30 is mounted in the first part 14 of the housing 12, and the fourth camera 32 is mounted in the second part 16 of the housing 12. In the example shown in FIG. 2A, the third and fourth cameras 30, 32 may be configured to face forward with respect to the first and second displays 14, 16. Accordingly, the first and second cameras 26, 28 may be configured to face rearward with respect to the first and second displays 14, 16, as illustrated in FIG. 2B. In the implementations illustrated herein, the directionality of a camera is described in the context of the camera's associated display. Thus, in the example of FIG. 2A, as the first and second displays 14, 16 are facing the same direction, both of the forward facing cameras 30, 32 are also facing the same direction.

In the illustrated examples provided in FIGS. 2A and 2B, the first and third cameras 26, 30 are mounted in the first part 14 of the housing 12, and the second and fourth cameras 28, 32 are mounted in the second part 16 of the housing 12; however, it will be appreciated that the first, second, third, and fourth cameras 26, 28, 30, 32 may be mounted in either the first or second parts 14, 16 of the housing 12 and may be configured as front facing or rear facing cameras. It will be further appreciated that the cameras may be configured as RGB cameras, wide angle cameras, fish eye cameras, or another type of camera.

Figures 3A, 3B, 3C, 3D:
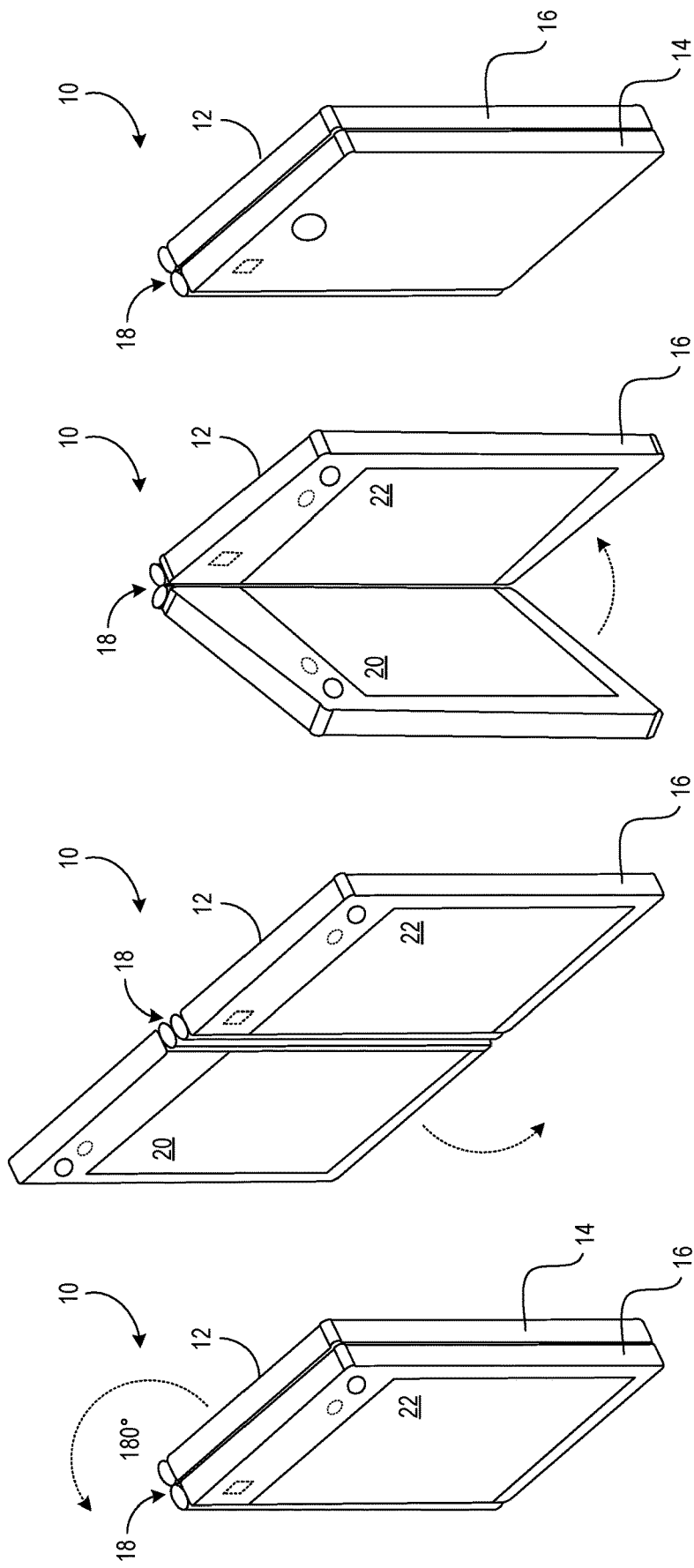
FIGS. 3A-3D show the mobile computing device of FIG. 1 with the first and second displays arranged in a variety of angular orientations from back-to-back to face-to-face.

Turning now to FIGS. 3A-3D, the first and second parts 14, 16 of the housing 12 of the mobile computing device 10 are illustrated in a variety of angular orientations. As described above, the hinge 18 permits the first and second parts 14, 16 of the housing 12 to rotate relative to one another such that an angle between the first and second parts 14, 16 can be decreased or increased by the user via applying suitable force to the housing 12 of the mobile computing device 10. The relative angular displacement is measured between an emissive side of each of the first and second displays, 20, 22. As shown in FIGS. 3A to 3D, the first and second parts 14, 16 of the housing 12 may be rotated in a range up to 360 degrees from a fully open back-to-back angular orientation, with respect to the first and second displays 20, 22, as shown in FIG. 3A to a fully closed face-to-face orientation as shown in FIG. 3D. While the example implementation illustrates the first and second parts 14, 16 of the housing 12 rotating in a 360 degree orientation, it will be appreciated that alternate implementations of the device may rotate through an angle range that is less than 360 degrees.

In one implementation, the face-to-face angular orientation is defined to have an angular displacement as measured from display to display of between 0 degrees and 90 degrees, an open angular orientation is defined to be between 90 degrees and 270 degrees, and the back-to-back orientation is defined to be between 270 degrees and 360 degrees. Alternatively, an implementation in which the open orientation is not used to trigger behavior may be provided, and in this implementation, the face-to-face angular orientation may be defined to be between 0 degrees and 180 degrees and the back-to-back angular orientation may be defined to be between 180 degrees and 360 degrees. In either of these implementations, when tighter ranges are desired, the face-to-face angular orientation may be defined to be between 0 degrees and 60 degrees, or more narrowly to be between 0 degrees and 30 degrees, and the back-to-back angular orientation may be defined to be between 300 degrees and 360 degrees, or more narrowly to be between 330 degrees and 360 degrees. The 0 degree position may be referred to as fully closed in the fully face-to-face angular orientation and the 360 degree position may be referred to as fully open in the back-to-back angular orientation. In implementations that do not use a double hinge and which are not able to rotate a full 360 degrees, fully open and/or fully closed may be greater than 0 degrees and less than 360 degrees.

As shown in FIG. 3A, in an angular orientation in which the first and second parts 14, 16 are in a fully open back-to-back angular orientation, the first and second displays 20, 22 face away from each other. Thus, while using the mobile computing device 10 in this orientation, the user may only be able to view either the first display 20 or the second display 22 at one time. Additionally, with the first and second parts 14, 16 in a fully open back-to-back angular orientation, the forward facing cameras, depicted here as the third and fourth cameras 30, 32, also face in the same direction as their respective display, and thus also face away from each other.

When the first part 14 of the housing 12 is rotated via the hinge 18 by 180 degrees with respect to the second part 16 of the housing 12, an angular orientation of the mobile computing device 10 in which the first and second parts 14, 16, and thus the first and second displays 20, 22, are arranged in an open side-by-side orientation is achieved, and the first and second displays 20, 22 face the same direction, as illustrated in FIG. 3B. The first part 14 of the housing 12 may be further rotated, as shown in FIG. 3C to a position in which the first and second displays 20, 22 are facing toward each other. Continuing to rotate the first part 14 of the housing 12 may place the displays 20, 22 in a fully closed face-to-face orientation, as shown in FIG. 3D. Such an angular orientation may help protect the displays 20, 22.

Thus, the sequence of angular orientations depicted in FIGS. 3A-3D illustrate that the first and second parts 14, 16 of the housing 12 of the mobile computing device 10 may be rotated a full 360 degrees via the hinge 18 to be arranged at any angular orientation with respect to one another. Accordingly, a user can arrange the mobile computing device 10 in unconventional positions that permit the user to preview and capture images and video content in conditions that require a perspective that would be difficult or impossible to achieve otherwise.

While the example implementation provided herein describes the rotation of the first part 14 of the housing 12 to achieve the various angular orientations, it will be appreciated that either or both of the first and second parts 14, 16 of the housing 12 may be rotated via the hinge 18. It will be further appreciated that the first and second parts 14, 16 of the mobile computing device 10 may rotate from a back-to-back to face-to-face angular orientation as illustrated, as well as from a face-to-face to a back-to-back angular orientation, such as proceeding through the sequence depicted by FIGS. 3A-3D in reverse.

As discussed above, the angle sensor 24A may be configured to measure the relative angular displacement between the first and second parts 14, 16 of the housing 12, and the first and second inertial measurement units 38, 40 may be configured to measure magnitude and a direction of acceleration to sense an orientation of the respective parts of the housing 12. When the user applies force to the housing 12 of the mobile computing device 10 to rotate the first and second parts 14, 16, the inertial measurement units 38, 40 may detect the resulting movement, and the angle sensor 24A may calculate a new current angular orientation resulting after the user ceases rotation of the first and second parts 14, 16 of the housing 12. Input from the angle sensor 24A and the first and second inertial measurement units 38, 40 may be processed by the processor 34 to define a hinge gesture that may determine a camera function. For example, the hinge gesture defined by rotating the first and second displays 20, 22 from a face-to-face angular orientation (see FIG. 3D) to a side-by-side orientation (see FIG. 3B) may determine a panoramic camera function that captures a panoramic image. In addition to the panoramic camera function is described herein, it will be appreciated that a plurality of hinge gestures may be defined to determine corresponding camera functions, as determined by the user or the mobile computing device 10.

Figure 4:
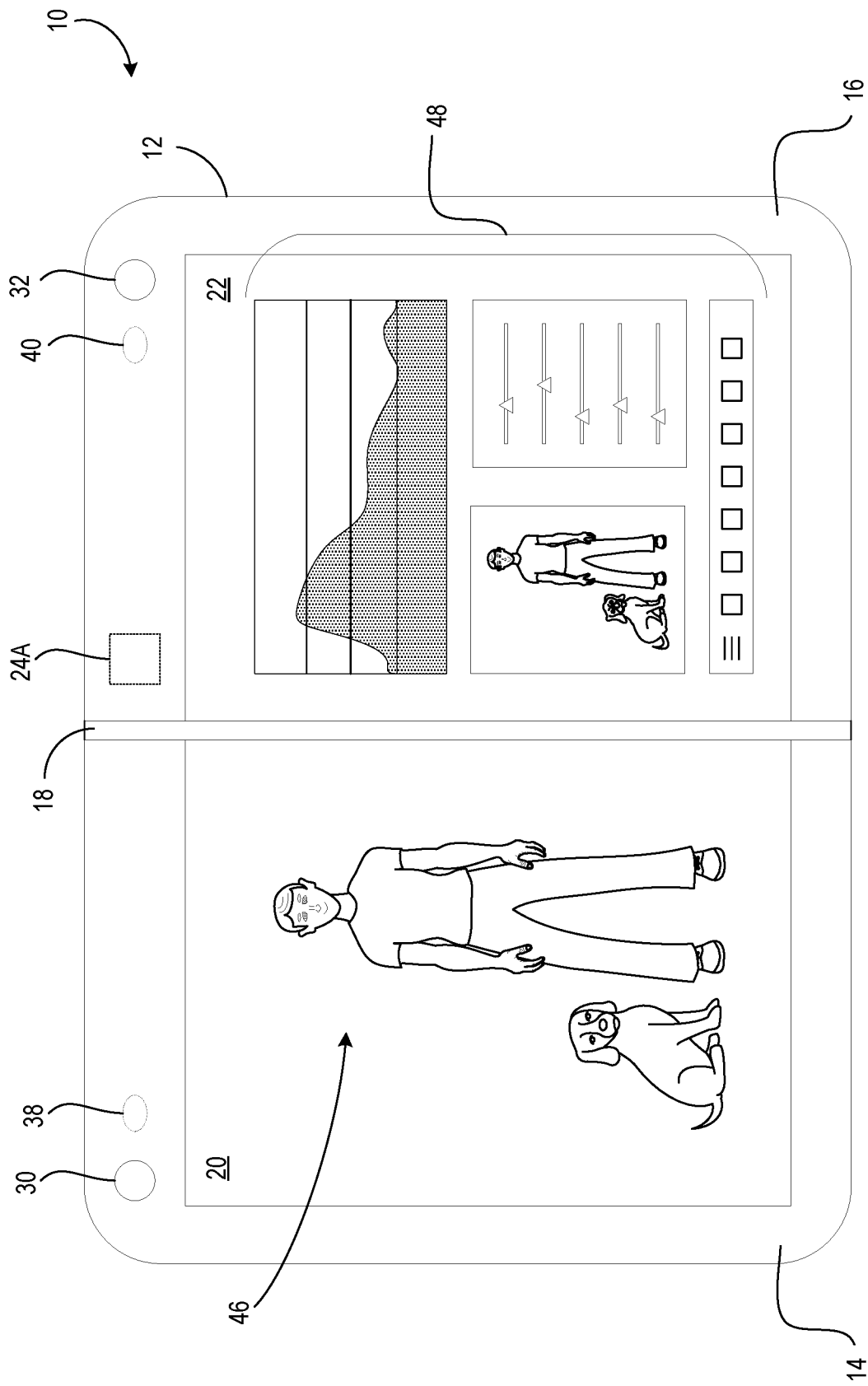
FIG. 4 shows the mobile computing device of FIG. 1 with a preview image displayed on the first display and an on-screen indication of an image processing mode for the preview image displayed on the second display.

As discussed below with reference to FIGS. 4 through 8, arranging the first and second displays 20, 22 of the mobile computing device 10 in a side-by-side orientation allows a user access to several camera functions. In any of the implementations described in which the first and second displays 20, 22 of the mobile computing device 10 are in a side-by-side orientation, the first and second displays 20, 22 may face the user to provide a live preview image 46 of the environment as viewed by one or more active cameras. Additionally or alternatively, as shown in FIG. 4, the first display may be configured to display a preview image 46 from the first camera 26, and the second display may be configured to display an on-screen indication of an image processing mode 48 for the preview image 46.

Figure 5:
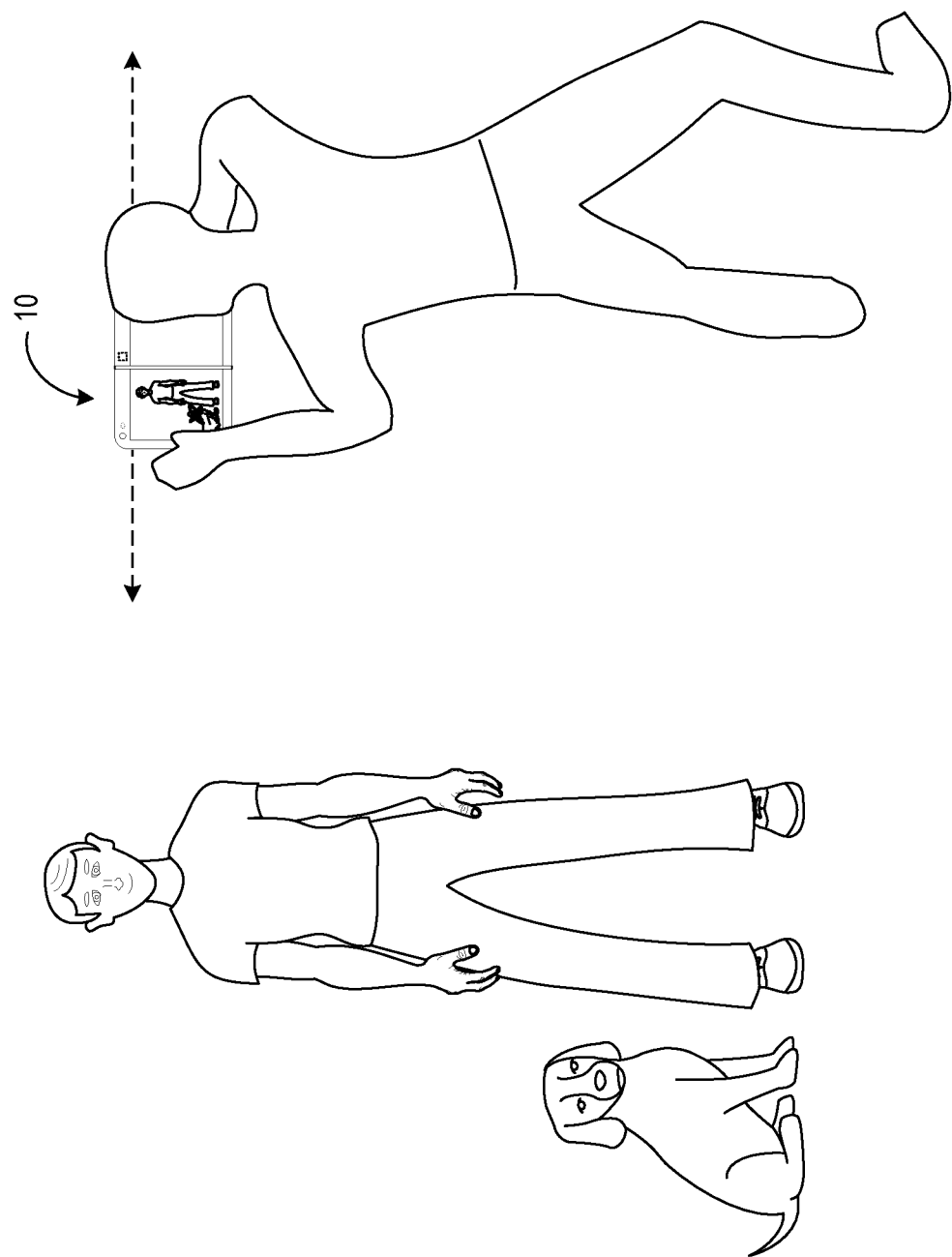
FIG. 5 shows an example of a user operating the mobile computing device of FIG. 1 with the first and second displays 20, 22 arranged in an open, side-by-side orientation to capture an image.

FIG. 5. illustrates an example scenario of a user capturing an image with the first and second displays 20, 22 of the mobile computing device 10 arranged in a side-by-side orientation, with reference to FIG. 2A. Here, the user may capture a static wide frame image in a landscape orientation. Additionally or alternatively, the user may scan the environment with the mobile computing device 10 to capture a panoramic image. The wide field of view sensor 36 may be configured to define a plurality of tracking points that provide data to stabilize images and assist in the post processing stitching of the images captured in a panoramic camera function. It will be appreciated that another type of sensor, such as a time-of-flight sensor or a sonar based depth sensor may be used in addition or alternatively to the wide field of view sensor 36 to determine the spatial orientation of the device 10 and assist in the post processing stitching of the images. When one or more of the included cameras is configured as a fish eye camera or another suitable camera type, data provided by the tracking points may be processed to recreate the captured environment with a sense of depth to produce a three-dimensional (3D) image. Further, switching the camera function from the rear facing first and second cameras 26, 28 to the forward facing third and fourth cameras 30, 32 permits a user to capture "selfie" style images, which may be processed as a conventional image or as a 3D image when captured with a suitable camera type. While the provided examples are described in the context of still images, it will be appreciated that video content may be similarly captured and processed according to any of the implementations described herein.

Figure 6:
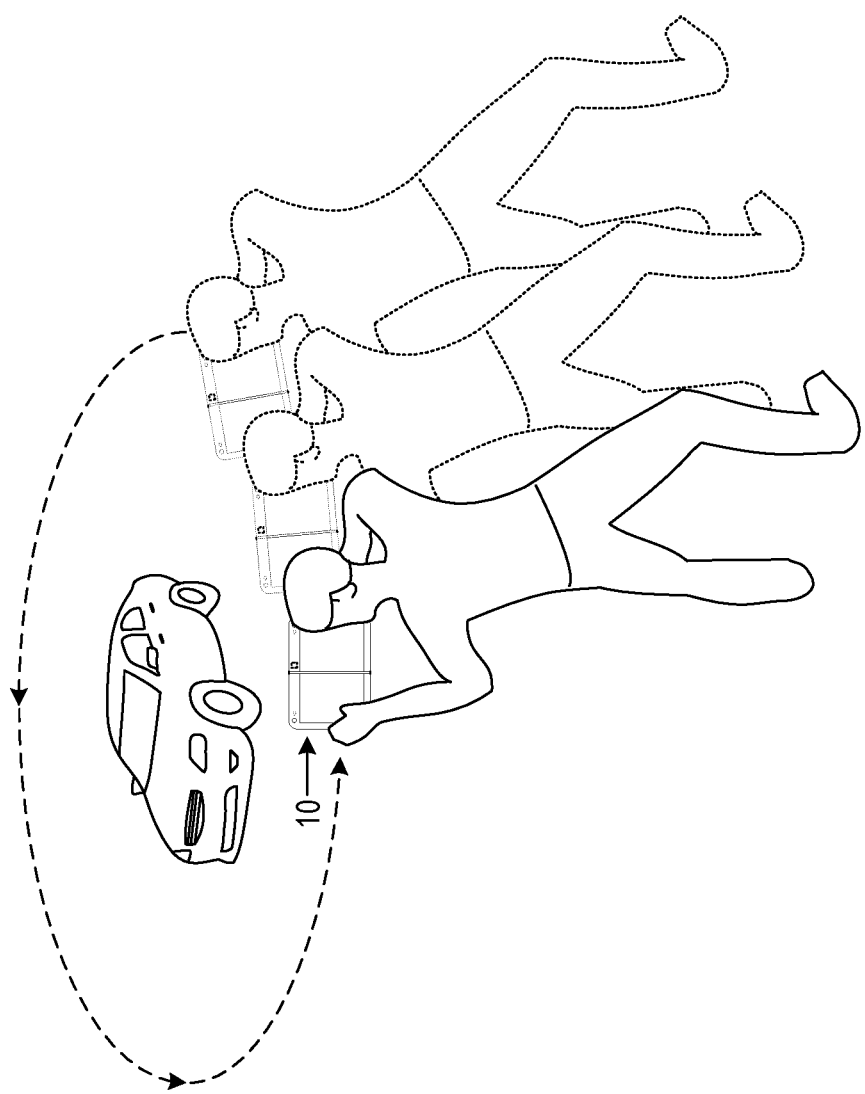
FIG. 6 shows an example of a user operating the mobile computing device of FIG. 1 to capture a three-dimensional scan of a subject.

Turning now to FIG. 6, an illustration of a 3D scan camera function with the first and second displays 20, 22 of the mobile computing device 10 arranged in a side-by-side orientation, with reference to FIG. 2A, is shown. In this implementation, a user may move the mobile computing device 10 around a stationary subject to capture a series of images with one or more rear facing cameras that may be configured as fish eye cameras, a pair of field of view cameras, or any other suitable type of camera. A sensor such as the wide field of view sensor 36 may be configured to define a plurality of tracking points. Upon processing data from these tracking points, the images may be stitched together to provide a seamless panoramic 3D image that may be manipulated such that the subject image may be viewed at any point along a 360 degree rotational range. As discussed above, another type of sensor, such as a time-of-flight sensor or a sonar based depth sensor may be used in addition or alternatively to the wide field of view sensor 36 to determine the spatial orientation of the device 10 and assist in the post processing stitching of the images.

Figure 7:
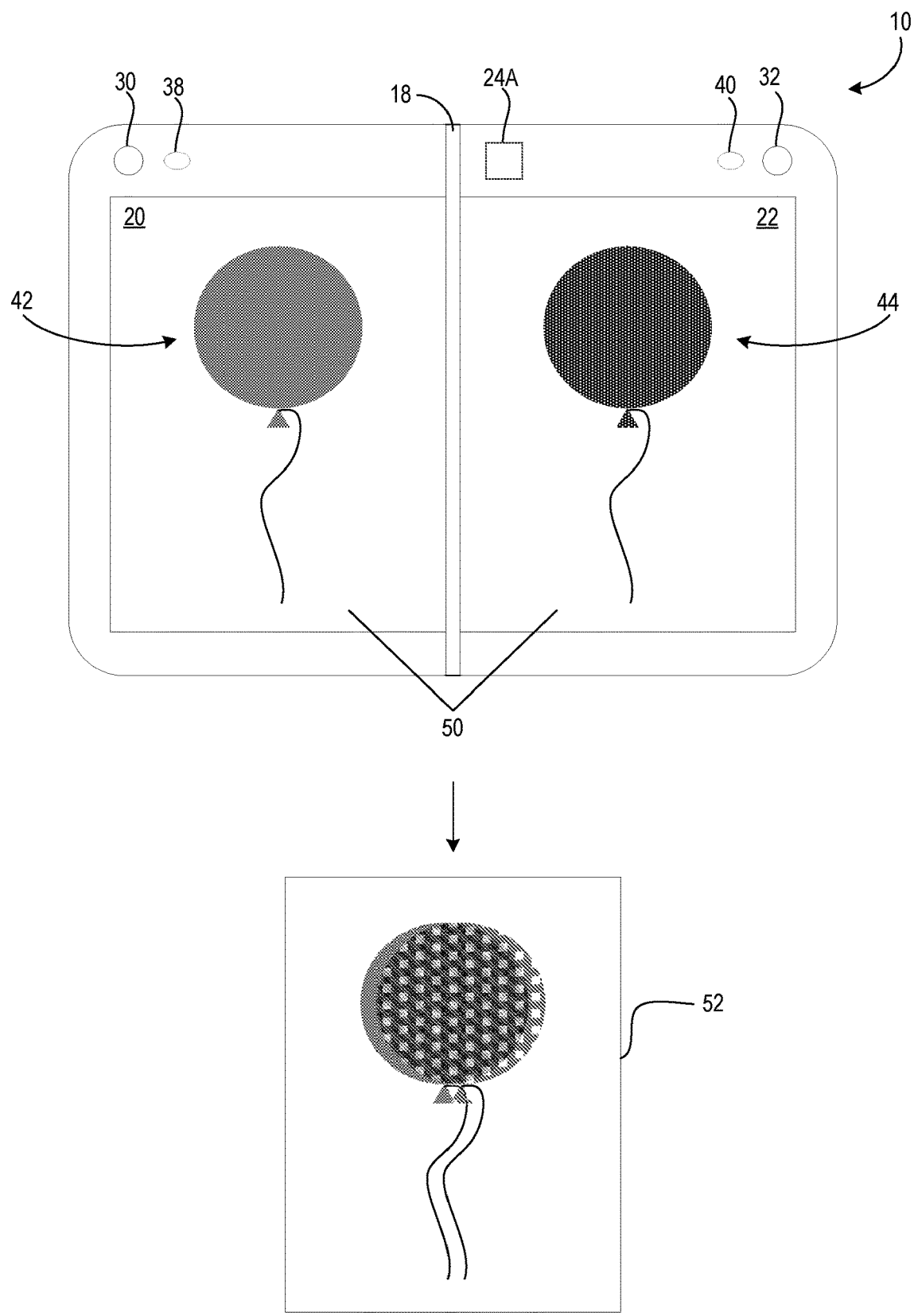
FIG. 7 shows an example of the mobile computing device of FIG. 1 in which an image is displayed in stereo on both the first and second displays and processed to produce an anaglyph image.
Figure 8:
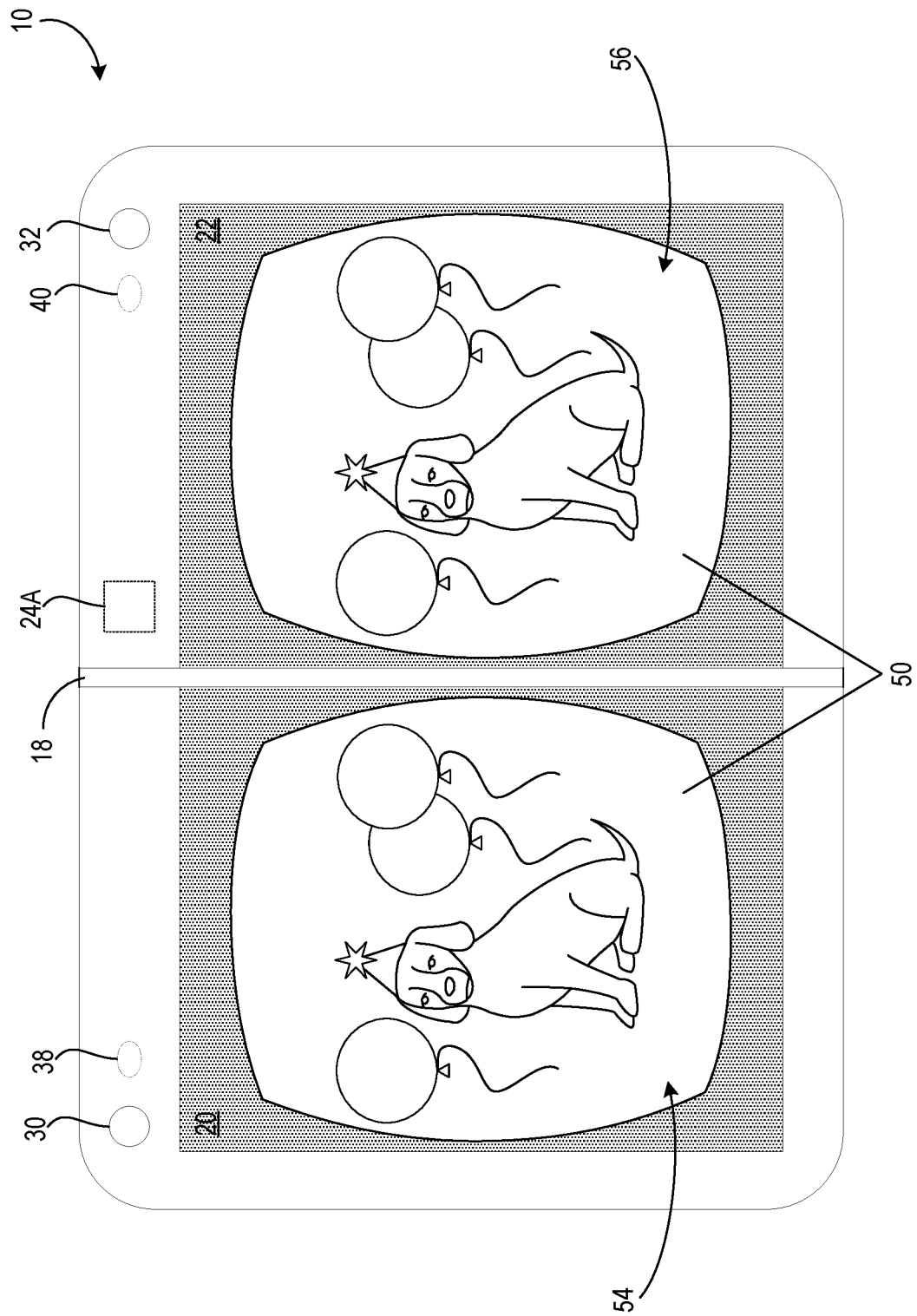
FIG. 8 shows an example of the mobile computing device of FIG. 1 in which an image is displayed in a split screen virtual reality format.

FIGS. 7 and 8 show the first and second displays 20, 22 of the mobile computing device 10 arranged in a side-by-side orientation and illustrate a camera function in which the first camera 26 and the second camera 28 simultaneously capture a respective first image 42 and a respective second image 44 and display them on the first and second displays 20, 22, respectively. In some implementations, the first and second images 42, 44 may be captured as a stereo pair 50 of images, using the known distance D between the first and second cameras 26, 28 to assign a suitable perspective to each of the first and second images 42, 44.

Looking first at FIG. 7, the first image 42 of the stereo pair 50 may be processed with a red filter, and the second image 44 of the stereo pair 50 may be processed with a cyan filter. After color processing, the stereo pair 50 of images may be displayed as a single anaglyph image 52. A user may then view the anaglyph image through red/blue lenses to visualize a 3D effect.

Turning now to FIG. 8, the first display 20 and the second display 22 may be configured to display the first and second images 42, 44 of the stereo pair 50 through the perspective of a left eye field of vision 54 and a right eye field of vision 56. Processing and displaying the stereo pair 50 of images in this way may provide a split screen virtual reality (VR) experience for the user, when viewed in the context of an appropriate VR device. The mobile computing device 10 may be further implemented as a platform for playback of VR video content on the first and second displays 20, 22 with a suitable VR device.

While the example implementations include processing a stereo pair 50 of images to be viewed as an anaglyph or in split screen VR, it will be appreciated that additional or alternative processing techniques may be applied to the stereo pair 50 of images to produce an effect of depth perception, such as generating 3D geometry. For example, the stereo pair 50 of images may rendered to a 3DTV and viewed as 3D content through polarized or active-shutter glasses.

Figure 9:
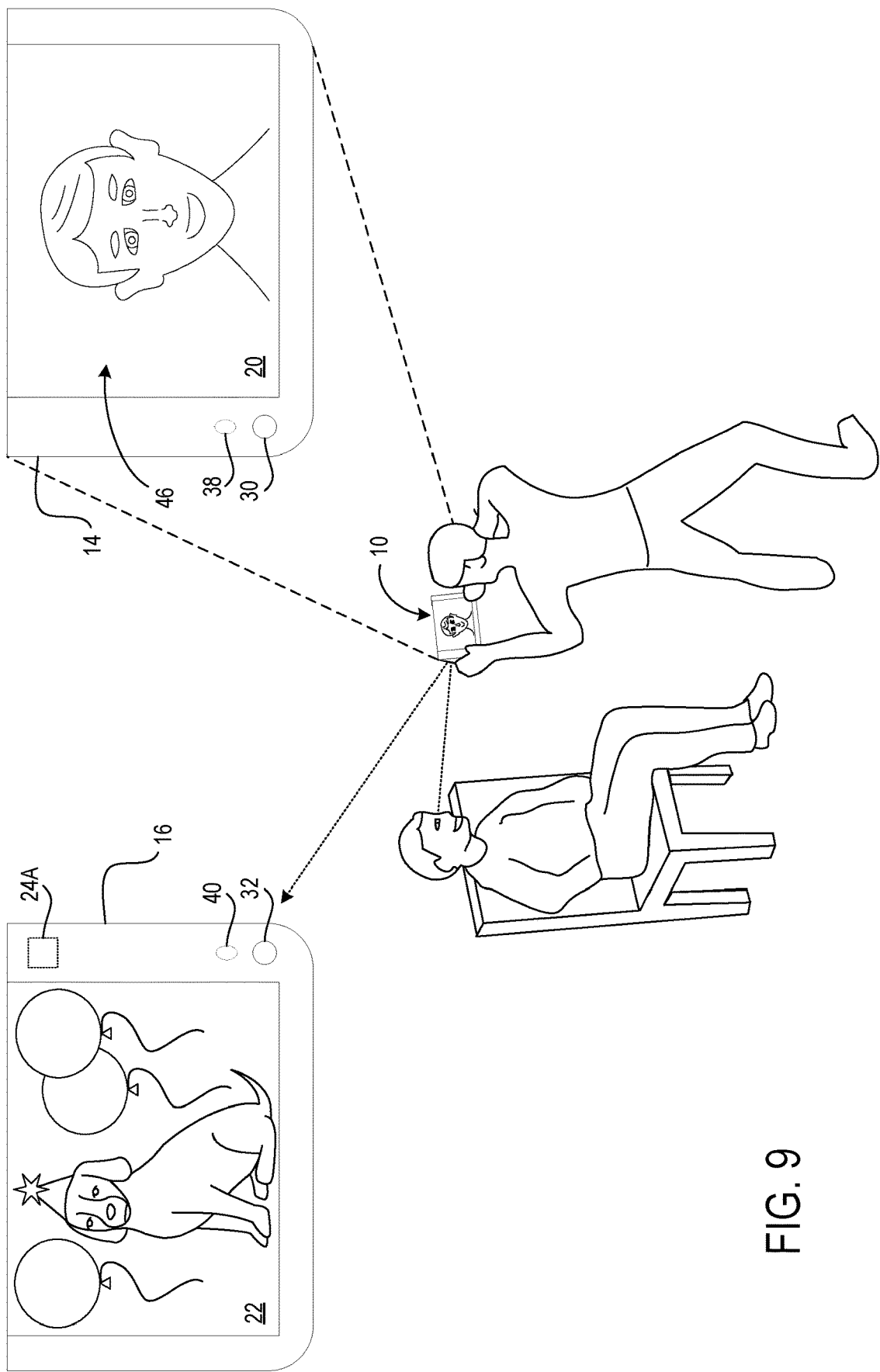
FIG. 9 shows an example of the mobile computing device of FIG. 1 in which the displays are configured in a back-to-back, reflex orientation to capture an image displayed on the first display while a subject views the second display.
Figure 10:
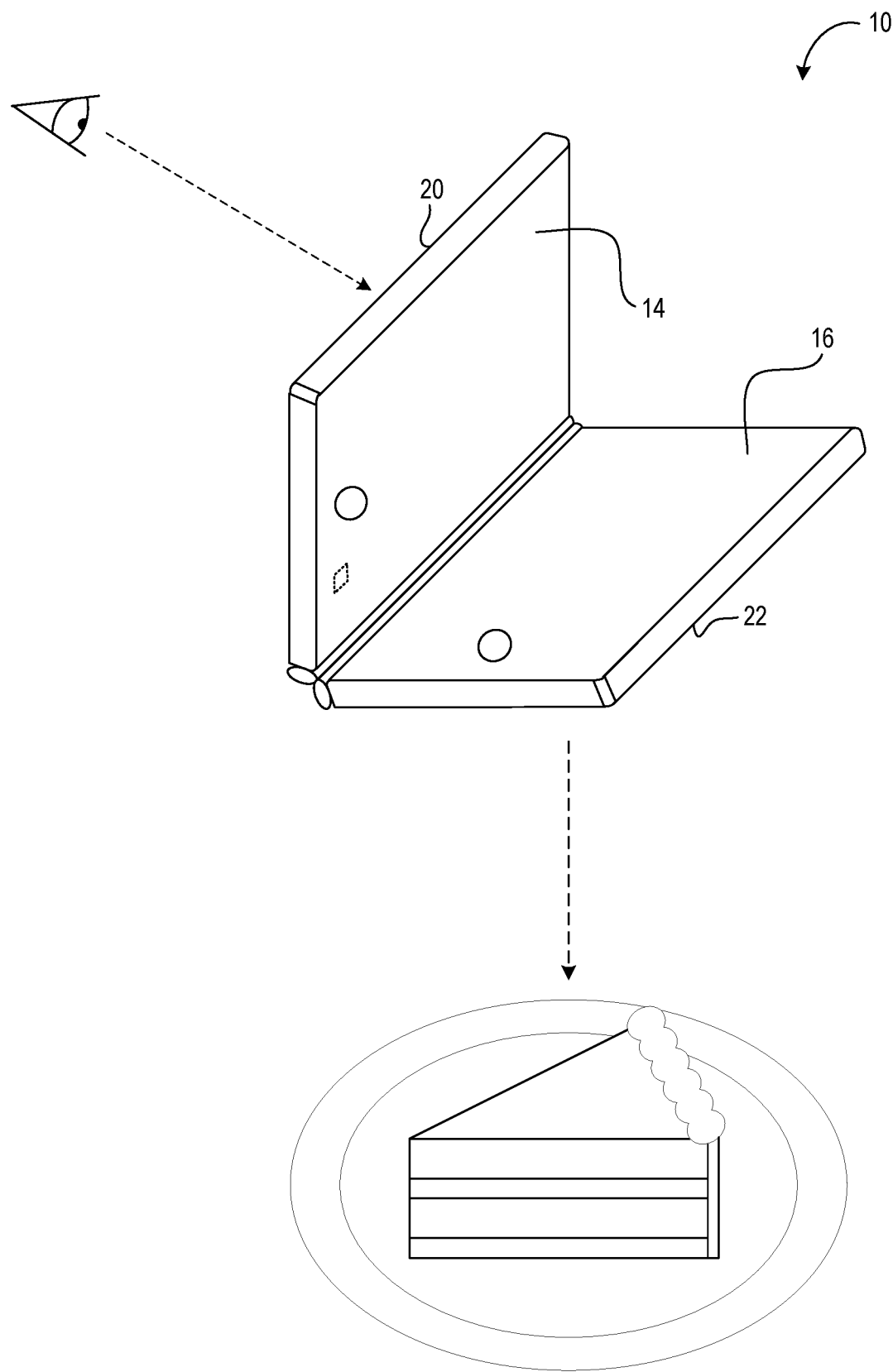
FIG. 10 shows an example of the mobile computing device of FIG. 1 in which the displays are configured in at a substantially orthogonal angle to capture an image of a subject.

In addition to the exemplary implementations described above in which the first and second displays 20, 22 of the mobile computing device 10 are arranged in a side-by-side orientation, the first and second parts 14, 16 of the mobile computing device 10 may be rotated to achieve additional camera functions. For example, as shown in FIGS. 9 and 10, the mobile computing device 10 may be arranged to have the first display 20 facing the user and the second display 22 facing a subject. In this angular orientation, the front facing fourth camera 32 may be used to capture an image of the subject, and the first display 20 may be configured to display a preview image 46 to the user.

FIG. 9 illustrates an example implementation in which the angular orientation of the first and second displays 20, 22 is configured to be in a flex orientation. With the second display 22 facing the subject, a user may choose to display an image or video content of interest to the subject on the second display 22 to capture the subject's attention and cause the subject to look at the second display 22, and thus also at the fourth camera 32.

FIG. 10 illustrates an example implementation in which the angular orientation of the first and second displays 20, 22 is configured to be substantially orthogonal. With this configuration, the user may comfortably and conveniently face forward while capturing images from a "top down" perspective. The mobile computing device 10 may also be rotated to obtain low angle or periscope perspectives. FIGS. 9 and 10 provide two exemplary implementations of how the angular orientation of the first and second displays 20, 22 may be configured to capture images; however, it will be appreciated that the angular orientation of the first and second displays 20, 22 of the mobile computing device 10 may be manipulated in any number of configurations to acquire a desired image. Thus, the mobile computing device 10 may be used to capture images or video content of subjects that are typically in motion and/or challenging to engage, as well as accommodate unconventional angles and perspectives.

In any of the implementations described herein, it will be appreciated that cameras included in the mobile computing device 10 may be used to simultaneously capture static images or video content of the environment and the user at the same time.

Figure 11:
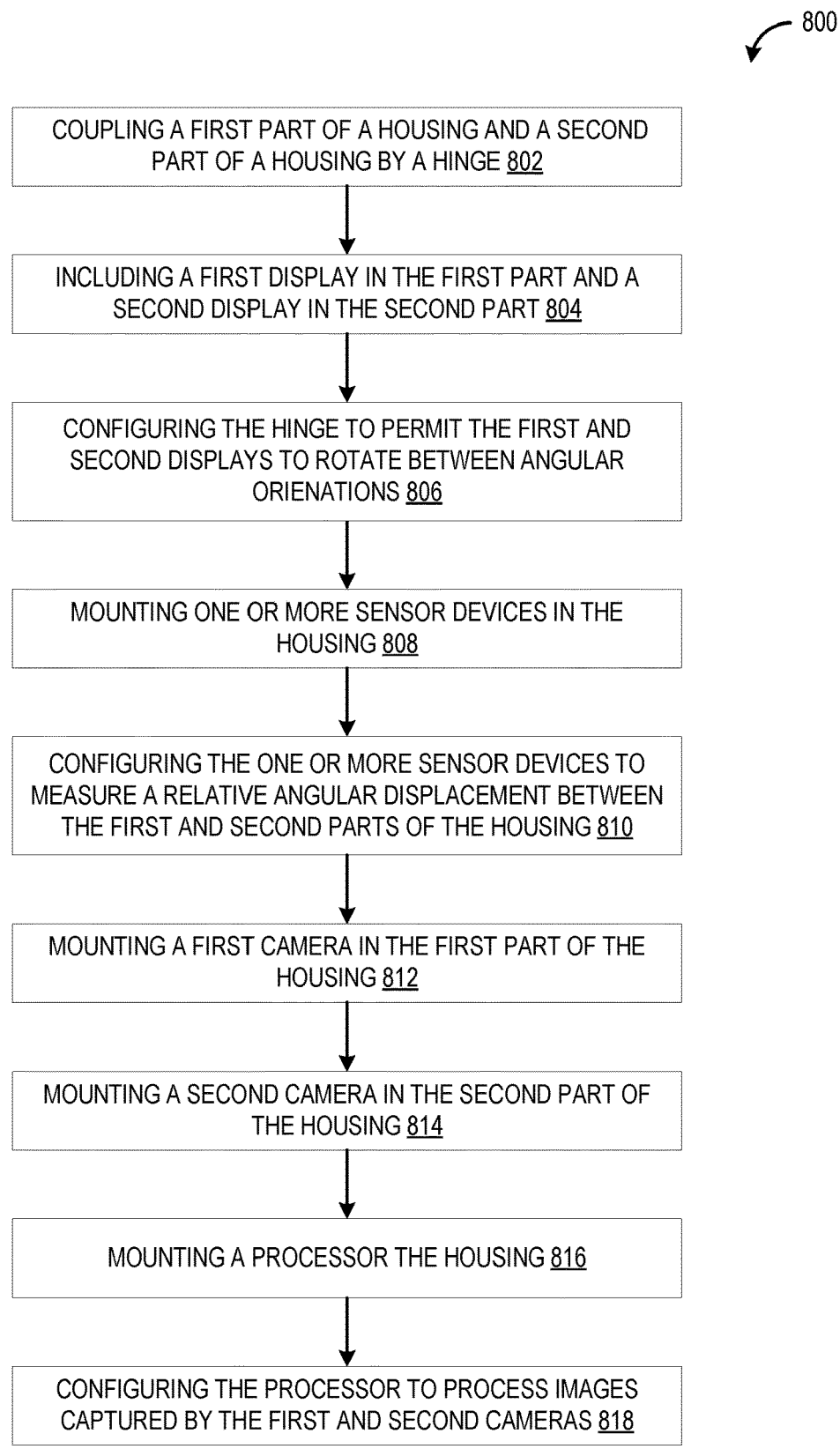
FIG. 11 shows a flowchart of a method for a mobile computing device, according to one implementation of the present disclosure.

FIG. 11 shows an example method 800 according to an embodiment of the present description. Method 800 may be implemented on the mobile computing device described above or on other suitable computer hardware. At step 802, the method 800 may include coupling a first part of a housing and a second part of the housing by a hinge.

Continuing from step 802 to step 804, the method may comprise including a first display in the first part and including a second display in the second part. As discussed above, the first and second displays may display respective first and second images, a preview image, an on-screen indication of an image processing mode for the preview image, a stereoscopic image, an anaglyph image, or video content. In some implementations, the first display and the second display may be configured to display a left eye field of vision and a right eye field of vision to provide a split screen virtual reality experience.

Proceeding from step 804 to 806, the method may include configuring the hinge to permit the first and second displays to rotate between angular orientations from a face-to-face angular orientation to a back-to-back angular orientation. As discussed above, the first and second displays may rotate around the hinge in a range up to 360 degrees, thereby permitting the mobile computing device to be arranged in a configuration that best suits the needs of the user for a desired function or environmental constraint.

Advancing from step 806 to step 808, the method may include mounting one or more sensor devices in the housing. As discussed above, sensor devices may include a wide field of view sensor, inertial measurement units, or the like. The wide field of view sensor may be configured to define a plurality of tracking points that determine a spatial orientation of the device, and inertial measurement units may be configured to measure a magnitude and a direction of acceleration in relation to standard gravity to sense an orientation of the respective parts of the housing.

Continuing from step 808 to step 810, the method may include configuring the one or more sensor devices to measure the relative angular displacement between the first and second parts of the housing. As discussed above, the first and second parts of the housing may be rotated around the hinge, and data from the one or more sensor devices may provide the relative orientation of the first and second parts of the housing in relation to one another to determine a camera function or processing cap ability.

Proceeding from step 810 to step 812, the method may include mounting a first camera in the first part of the housing. As discussed above, the first camera is preferably rear facing with respect to the first display in the first part of the housing. However, the first camera may be a front facing camera in some implementations. The first camera may be configured as an RGB camera, wide angle camera, fish eye camera, or another suitable type of camera.

Advancing from step 812 to step 814, the method may include mounting a second camera in the second part of the housing. As discussed above, the second camera is preferably rear facing with respect to the second display in the second part of the housing. However, the second camera may be a front facing camera in some implementations. The second camera may be configured as an RGB camera, wide angle camera, fish eye camera, or another suitable type of camera. Images and data from the first and second cameras may be considered together or processed independently to achieve the user's desired result. As discussed above, in some implementations, the first camera and the second camera may simultaneously capture a respective first image and a respective second image as a stereo pair of images in which the first image of the stereo pair is processed with a red filter, the second image of the stereo pair is processed with a cyan filter, and the stereo pair of images is displayed as a single anaglyph image.

Continuing from step 814 to step 816, the method may include mounting a processor in the housing. As discussed above, the processor may process input from the one or more sensor devices and first and second inertial measurement units to define a hinge gesture that determines a camera function. The processor may be further configured to process data from the wide field of view sensor to define tracking points that stabilize images and assist in post processing stitching of the images to recreate the environment.

Proceeding from step 816 to step 818, the method may include configuring the processor to process images captured by the first and second cameras. As discussed above, the mobile computing device may be configured to capture images according to a selected camera function. The camera function selection may be based upon the relative angular displacement measured by the one or more sensor devices. For example, detecting that the first and second displays are moved from a back-to-back orientation to a side-by-side orientation may be recognized as a hinge gesture that determines a panoramic camera function.

Figure 12:
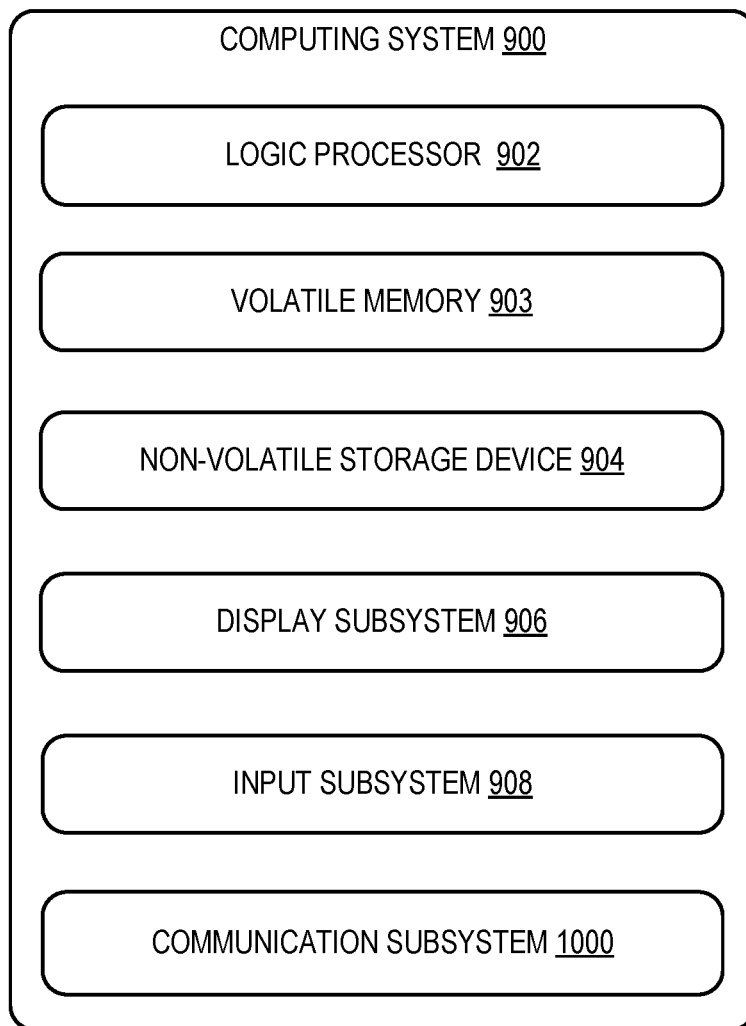
FIG. 12 shows an example computing system according to one implementation of the present disclosure.

FIG. 12 schematically shows a non-limiting embodiment of a computing system 900 that can enact one or more of the methods and processes described above. Computing system 900 is shown in simplified form. Computing system 900 may embody the mobile computing device 10 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 12.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a mobile computing device comprising a housing having a first part and a second part coupled by a hinge, one or more sensor devices mounted in the housing, a first camera mounted in the first part of the housing, a second camera mounted in the second part of the housing, and a processor mounted in the housing. The first part may include a first display, and the second part may include a second display. The hinge may be configured to permit the first and second displays to rotate between angular orientations from a face-to-face angular orientation to a back-to-back angular orientation. The one or more sensor devices mounted in the housing may be configured to measure a relative angular displacement between the first and second parts of the housing. The processor may be configured to process images captured by the first and second cameras according to a selected function based upon the relative angular displacement measured by the one or more sensor devices. In this aspect, additionally or alternatively, the mobile computing device may include a wide field of view sensor mounted in the housing and configured to define a plurality of tracking points that determine a spatial orientation of the device. In this aspect, additionally or alternatively, the first part of the housing may include a first inertial measurement unit, and the second part of the housing may include a second inertial measurement unit. The first and second inertial measurement units may each be configured to measure a magnitude and a direction of acceleration in relation to standard gravity to sense an orientation of the respective parts of the housing. In this aspect, additionally or alternatively, the processor may be further configured to process input from the one or more sensor devices and the first and second inertial measurement units to define a hinge gesture. In this aspect, additionally or alternatively, the hinge gesture may determine a camera function. In this aspect, additionally or alternatively, the hinge gesture defined by rotating the first and second displays from a face-to-face angular orientation to a side-by-side orientation may determine a panoramic camera function that captures a panoramic image. In this aspect, additionally or alternatively, the first camera and the second camera may simultaneously capture a respective first image and a respective second image. In this aspect, additionally or alternatively, the first and second images may be captured as a stereo pair of images. The first image of the stereo pair may be processed with a red filter, the second image of the stereo pair may be processed with a cyan filter, and the stereo pair of images may be displayed as a single anaglyph image. In this aspect, additionally or alternatively, the first display and the second display may be configured to display a left eye field of vision and a right eye field of vision to provide a split screen virtual reality experience. In this aspect, additionally or alternatively, the first display may display a preview image from the first camera, and the second display may display an on-screen indication of an image processing mode for the preview image. In this aspect, additionally or alternatively, a third camera may be mounted in the first part of the housing, and a fourth camera may be mounted in the second part of the housing. The processor may be further configured to process images captured by the third and fourth cameras. In this aspect, additionally or alternatively, the first and second cameras may be configured to face rearward with respect to the first and second displays, and the third and fourth cameras may be configured to face forward with respect to the first and second displays. In this aspect, additionally or alternatively, the relative angular displacement may be measured between an emissive side of each of the first and second displays. The face-to-face angular orientation may be between 0 degrees and 90 degrees, an open angular orientation may be between 90 degrees and 270 degrees, and the back-to-back angular orientation may be between 270 degrees and 360 degrees.

Another aspect provides a method for a mobile computing device comprising coupling a first part of a housing and a second part of the housing by a hinge, including a first display in the first part and including a second display in the second part, configuring the hinge to permit the first and second displays to rotate between angular orientations from a face-to-face angular orientation to a back-to-back angular orientation, mounting one or more sensor devices in the housing, configuring the one or more sensor devices to measure a relative angular displacement between the first and second parts of the housing, mounting a first camera in the first part of the housing, mounting a second camera in the second part of the housing, mounting a processor in the housing, and configuring the processor to process images captured by the first and second cameras according to a selected function based upon the relative angular displacement measured by the one or more sensor devices. In this aspect, additionally or alternatively, the method may further comprise mounting a wide field of view sensor mounted in the housing, the wide field of view sensor being configured to define a plurality of tracking points that determine a spatial orientation of the device, including a first inertial measurement unit in the first part of the housing, and including a second inertial measurement unit in the second part of the housing, wherein the first and second inertial measurement units may be configured to measure a magnitude and a direction of acceleration in relation to standard gravity to sense an orientation of the respective parts of the housing. In this aspect, additionally or alternatively, the method may further comprise configuring the processor to process input from the one or more sensor devices and the first and second inertial measurement units to define a hinge gesture, wherein the hinge gesture may determine a camera function. In this aspect, additionally or alternatively, the hinge gesture defined by rotating the first and second displays from a face-to-face angular orientation to a side-by-side orientation may determine a panoramic camera function that captures a panoramic image. In this aspect, additionally or alternatively, the first camera and the second camera may simultaneously capture a respective first image and a respective second image, the first and second images may be captured as a stereo pair of images, the first image of the stereo pair may be processed with a red filter, the second image of the stereo pair may be processed with a cyan filter, and the stereo pair of images may be displayed as a single anaglyph image. In this aspect, additionally or alternatively, the first display and the second display may be configured to display a left eye field of vision and a right eye field of vision to provide a split screen virtual reality experience.

Another aspect provides a mobile computing device comprising a housing having a first part and a second part coupled by a hinge, one or more sensor devices mounted in the housing, a wide field of view sensor mounted in the housing, one or more inertial measurement units, one or more cameras mounted in the housing, and a processor mounted in the housing. The first part may include a first display, and the second part may include a second display. The hinge may be configured to permit the first and second displays to rotate between angular orientations from a face-to-face angular orientation to a back-to-back angular orientation. The one or more sensor devices mounted in the housing may be configured to measure a relative angular displacement between the first and second parts of the housing. The wide field of view sensor may be configured to define a plurality of tracking points that determine a spatial orientation of the device. The one or more inertial measurement units may be configured to measure a magnitude and a direction of acceleration in relation to standard gravity to sense an orientation of the respective parts of the housing. The processor may be configured to process input from the sensor devices and inertial measurement units to define a hinge gesture that determines a camera function.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device comprising:
a housing having a first part and a second part coupled by a hinge, the first part including a first display and the second part including a second display, wherein the hinge is configured to permit the first and second displays to rotate between angular orientations from a face-to-face angular orientation to a back-to-back angular orientation;
one or more sensor devices mounted in the housing and configured to measure a relative angular displacement between the first and second parts of the housing;
a first camera mounted in the first part of the housing;
a second camera mounted in the second part of the housing; and
a processor mounted in the housing, the processor being configured to process images captured by the first and second cameras according to a selected function of a plurality of available functions based upon the relative angular displacement measured by the one or more sensor devices to obtain one or more processed images, wherein
the one or more processed images are subsequently displayed on at least one of the first and second displays.

2. The mobile computing device according to claim 1, wherein
the mobile computing device includes a wide field of view sensor mounted in the housing and configured to define a plurality of tracking points that determine a spatial orientation of the device.

3. The mobile computing device according to claim 1, wherein
the first part of the housing includes a first inertial measurement unit, and
the second part of the housing includes a second inertial measurement unit, wherein
the first and second inertial measurement units are each configured to measure a magnitude and a direction of acceleration in relation to standard gravity to sense an orientation of the respective parts of the housing.

4. The mobile computing device according to claim 3, wherein
the processor is further configured to process input from the one or more sensor devices and the first and second inertial measurement units to define a hinge gesture that determines the selected camera function from the plurality of available camera functions.

5. The mobile computing device according to claim 4, wherein
the hinge gesture defined by rotating the first and second displays from a face-to-face angular orientation to a side-by-side orientation determines a panoramic camera function that captures a panoramic image as the camera function.

6. The mobile computing device according to claim 1, wherein
the first camera and the second camera simultaneously capture a respective first image and a respective second image.

7. The mobile computing device according to claim 6, wherein
the first and second images are captured as a stereo pair of images;
the processor is configured to process the first image of the stereo pair with a red filter according to the selected function;
the processor is configured to process the second image of the stereo pair with a cyan filter according to the selected function; and
the stereo pair of images is displayed as a single anaglyph image.

8. The mobile computing device according to claim 1, wherein
the first display and the second display are configured to display a left eye field of vision and a right eye field of vision to provide a split screen virtual reality experience.

9. The mobile computing device according to claim 1, wherein
the first display displays a preview image from the first camera, and
the second display displays an on-screen indication of an image processing mode for the preview image.

10. The mobile computing device according to claim 1, the device further comprising:
a third camera mounted in the first part of the housing; and
a fourth camera mounted in the second part of the housing, wherein
the first and second cameras are configured to face rearward with respect to the first and second display,
the third and fourth cameras are configured to face forward with respect to the first and second displays, and
the processor is further configured to process images captured by the third and fourth cameras.

11. The mobile computing device according to claim 1, wherein
the relative angular displacement is measured between an emissive side of each of the first and second displays, and
the face-to-face angular orientation is between 0 degrees and 90 degrees,
an open angular orientation is between 90 degrees and 270 degrees, and
the back-to-back angular orientation is between 270 degrees and 360 degrees.

12. A method for a mobile computing device, the method comprising:
coupling a first part of a housing and a second part of the housing by a hinge;
including a first display in the first part and including a second display in the second part;
configuring the hinge to permit the first and second displays to rotate between angular orientations from a face-to-face angular orientation to a back-to-back angular orientation;
mounting one or more sensor devices in the housing;
configuring the one or more sensor devices to measure a relative angular displacement between the first and second parts of the housing;
mounting a first camera in the first part of the housing;
mounting a second camera in the second part of the housing;
mounting a processor in the housing;
configuring the processor to process images captured by the first and second cameras according to a selected function of a plurality of available functions based upon the relative angular displacement measured by the one or more sensor devices to obtain one or more processed images; and
subsequently displaying the one or more processed images on at least one of the first and second displays.

13. The method for a mobile computing device according to claim 12, the method further comprising:
mounting a wide field of view sensor mounted in the housing, the wide field of view sensor being configured to define a plurality of tracking points that determine a spatial orientation of the device;
including a first inertial measurement unit in the first part of the housing; and
including a second inertial measurement unit in the second part of the housing, wherein
the first and second inertial measurement units are each configured to measure a magnitude and a direction of acceleration in relation to standard gravity to sense an orientation of the respective parts of the housing.

14. The method for a mobile computing device according to claim 13, the method further comprising:
configuring the processor to process input from the one or more sensor devices and the first and second inertial measurement units to define a hinge gesture, wherein the hinge gesture determines the selected camera function from the plurality of available camera functions.

15. The method for a mobile computing device according to claim 14, wherein
the hinge gesture defined by rotating the first and second displays from a face-to-face angular orientation to a side-by-side orientation determines a panoramic camera function that captures a panoramic image as the selected camera function.

16. The method for a mobile computing device according to claim 12, wherein
the first camera and the second camera simultaneously capture a respective first image and a respective second image,
the first and second images are captured as a stereo pair of images,
the processor is configured to process the first image of the stereo pair with a red filter according to the selected function,
the processor is configured to process the second image of the stereo pair with a cyan filter according to the selected function, and
the stereo pair of images is displayed as a single anaglyph image.

17. The method for a mobile computing device according to claim 12, wherein
the first display and the second display are configured to display a left eye field of vision and a right eye field of vision to provide a split screen virtual reality experience.

18. A mobile computing device comprising:
a housing having a first part and a second part coupled by a hinge, the first part including a first display and the second part including a second display, wherein the hinge is configured to permit the first and second displays to rotate between angular orientations from a face-to-face angular orientation to a back-to-back angular orientation;
one or more sensor devices mounted in the housing and configured to measure a relative angular displacement between the first and second parts of the housing;
a wide field of view sensor mounted in the housing and configured to define a plurality of tracking points that determine a spatial orientation of the device;
one or more inertial measurement units configured to measure a magnitude and a direction of acceleration in relation to standard gravity to sense an orientation of the respective parts of the housing;
one or more cameras mounted in the housing; and
a processor mounted in the housing, wherein the processor is configured to:
process input from the one or more sensor devices and the one or more inertial measurement units to define a hinge gesture that determines a camera function from a plurality of available functions, and
process images captured by the one or more cameras according to the determined camera function using data from the wide field of view sensor, wherein the processed images are subsequently displayed on at least one of the first and second displays.

19. The mobile computing device according to claim 1, wherein
the selected function is selected from a group comprising: stitching together the images, application of three-dimensional image processing to the images, and application of color filters to the images.

20. The method for a mobile computing device according to claim 12, wherein
the selected function is selected from a group comprising: stitching together the images, application of three-dimensional image processing to the images, and application of color filters to the images.

* * * * *